United States Patent

[11] 3,565,099

| [72] | Inventor | Oscar R. Huber |
| | | Half Moon Bay, Calif. |
| [21] | Appl. No. | 21 |
| [22] | Filed | Jan. 2, 1970 |
| [45] | Patented | Feb. 23, 1971 |
| [73] | Assignee | John M. Young |
| | | Los Angeles, Calif. |

[54] REVERSIBLE CHECK VALVE
1 Claim, 3 Drawing Figs.

[52] U.S. Cl. ................................................. 137/269.5; 137/527.8
[51] Int. Cl. .................................................. F16k 15/03
[50] Field of Search ......................................... 137/269.5, 270, 269, 527.8, 520, 521, 218

[56] References Cited
UNITED STATES PATENTS

| 280,111 | 6/1883 | Bradley | 137/269.5 |
| 1,528,703 | 3/1925 | Showers | 137/269.5 |
| 2,347,199 | 4/1944 | Langdon | 137/521X |
| 2,277,295 | 3/1942 | Brown | 137/218 |
| 2,292,871 | 8/1942 | Dunn | 137/218 |
| 3,348,569 | 10/1967 | Frye | 137/269.5 |
| 3,363,650 | 1/1968 | Scaramucci | 137/269X |

Primary Examiner—M. Cary Nelson
Assistant Examiner—Robert J. Miller
Attorney—Joseph F. Cole ABSTRACT: A reversible check valve wherein a valve body defines a pair of end passageways and a central chamber communicating with the latter, the chamber having a rotatable valve plug mounted therein, the plug being made with a port for conveying fluid from one end passageway to the other in either direction. The plug has a seat in its port, and a swingable check valve flap coacts with the seat when the former is seated on the latter to prevent flow of fluid in one direction, while permitting reverse flow of the fluid upon unseating of the flap. The direction of flow is determined by the selective setting of the plug in either of two positions. Moreover, a counterweight is provided on the flap and is arranged to increase the surface area against which the back fluid pressure will act in urging the flap into closed position, the counterweight further preventing chattering of the flap and disposed to urge the flap closed by gravity.

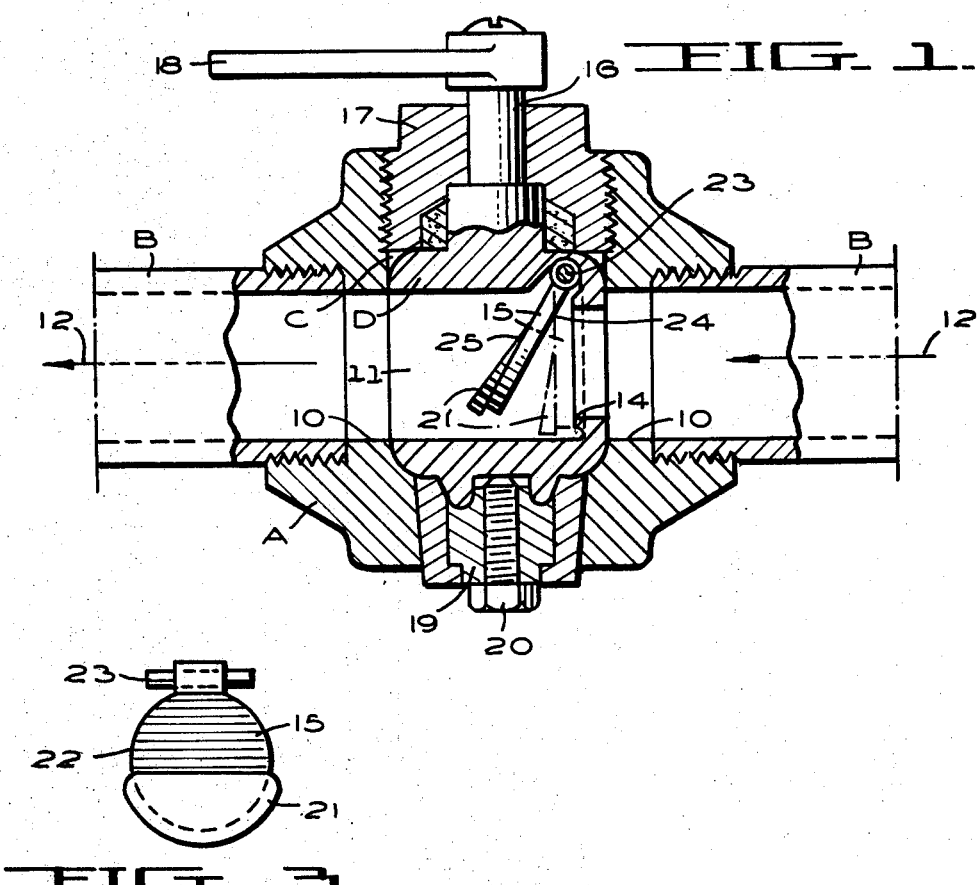
FIG. 1.
FIG. 3.
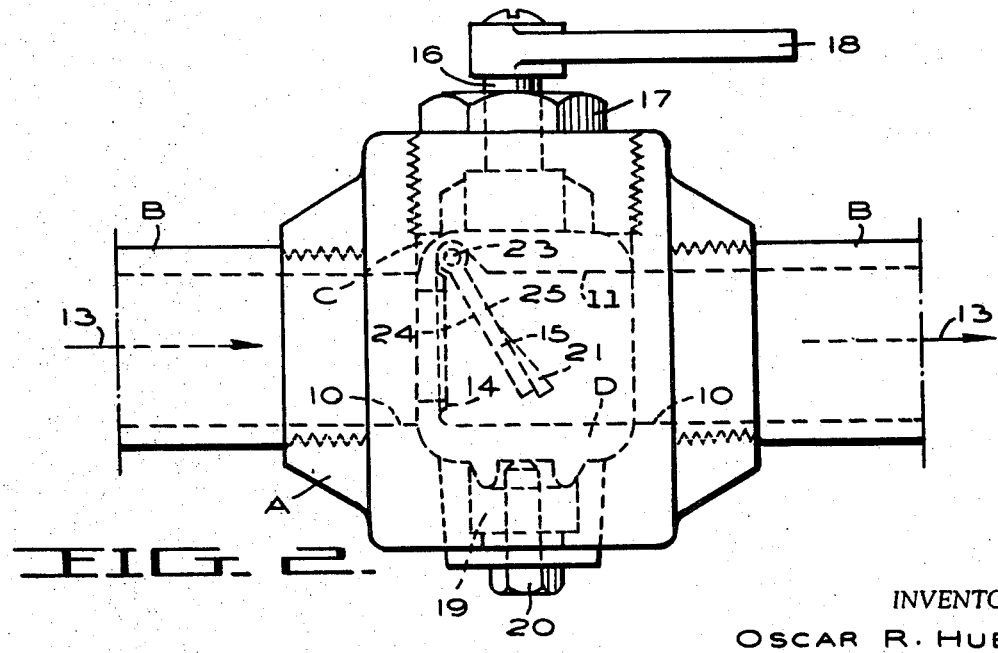
FIG. 2.
INVENTOR.
OSCAR R. HUBER
BY Joseph F. Cole
ATTORNEY

REVERSIBLE CHECK VALVE

SUMMARY

It is proposed in this invention to provide a reversible check valve which may be connected to a pair of fluid-conducting pipes, the valve having a body with end passageways and a central chamber communicating with the end passageways. A rotary valve plug is mounted in the body and has a port for conveying fluid from one end passageway to the other in either direction, the direction of flow being controlled by setting the plug in either of two selective positions. Moreover, a check valve is carried by the plug and is operable to permit flow in one direction while preventing reverse flow, as determined by the valve plug setting.

A further object of the invention is to provide a reversible check valve wherein a counterweight is provided on the flap of the check valve and arranged to increase the surface area against which back pressure of the fluid will act in urging the flap into closed position, the counterweight being sufficiently heavy to preventing chattering of the flap and being disposed to urge the flap closed by gravity.

BRIEF DESCRIPTION OF THE DRAWING

For a better understanding of the invention, reference should be made to the accompanying drawing, forming part of this specification, in which:

FIG. 1 is a longitudinal sectional view of my reversible check valve, with the parts arranged for fluid flow from right to left.

FIG. 2 is a side elevational view of the reversible check valve set for fluid flow from left to right.

FIG. 3 is a face view of the detached flap with its counterweight and journal pin.

While I have shown only the preferred embodiment of the invention, it should be understood that various changes, or modifications, may be made within the scope of the appended claims without departing from the spirit thereof.

DETAILED DESCRIPTION OF THE PREFERRED EMBODIMENT

Referring now to the drawing in detail, it will be noted that a valve body A defines a pair of end passageways 10 made to be connected to fluid-conducting pipes B, the valve body having a central chamber C communicating with the end passageways 10. Moreover, a valve plug D is rotatably mounted in the chamber C and has a port 11 extending therethrough, the port being located so as to be aligned with and communicate with the end passageways 10 upon turning the plug D into either of two predetermined settings or positions.

As shown in FIG. 1, the plug D is arranged for fluid flow from right to left, as indicated by arrows 12, while FIG. 2 shows the plug turned through 180° for fluid flow from left to right, as indicated by arrows 13. Accordingly, fluid may flow through the end passageways 10 and the port 11 in either direction.

The rotary plug D is provided with an annular seat 14 in its port 11, and a swingably mounted check valve flap 15 is carried by the plug and disposed in the port thereof, the flap 15 being movable into closed relation with the seat, as shown by dot-dash lines in FIG. 1, thus preventing flow of fluid in one direction, the flap also being swingable into position with respect to the seat, as shown by full lines in FIG. 1, thus permitting flow of fluid in the opposite direction. The direction of fluid flow depends upon the predetermined setting of the plug selected.

For the purpose of turning the valve plug D, the latter has a stem 16 projecting upwardly through a bushing 17 that may be screwed into the top part of the chamber C, and an operating handle 18 may be secured to this stem. Bearing 19 with an adjusting stud 20 support the bottom end of the plug D, while permitting rotation of the latter.

As an important structural feature, as clearly shown in the drawing, a counterweight 21 is provided on the flap 15 and projects outwardly in a radial direction beyond rim 22 of the flap and arranged to increase the total surface area against which back pressure of the fluid will act in urging the flap to close upon the seat 14, the counterweight being sufficiently heavy to prevent chattering of the flap.

It will be apparent from FIG. 1 that the wall diameter of the port 11 in the plug D is sufficiently large for the flap 15 and its counterweight 21 to swing into closed position without any obstruction by the wall of the port.

Turning now to FIGS. 1 and 3, it will be seen that the flap 15 is secured at its top to the plug D by a horizontal journal pin 23, the flap defining opposite faces 24 and 25, the face 24 being movable against the seat 14 and the counterweight being disposed on the other face 25 of the flap in outwardly offset relation with respect to a vertical plane passing through the journal pin, the offsetting being in a direction away from the seat to urge the counterweight and its flap toward the seat by gravity. The counterweight has been shown as being formed integral with the face 25 of the flap.

I claim:

1. In a reversible check valve:
   a. a valve body defining a pair of end passageways made to be connected to fluid-conducting pipes, the valve body having a central chamber communicating with the end passageways thereof;
   b. a valve plug rotatably mounted in the chamber and having a port extending therethrough, the port being located so as to be aligned with the end passageways in communication therewith, upon turning the plug into either of two predetermined settings, whereby fluid may flow through the passageways and port in either direction;
   c. the plug being provided with an annular seat in its port, and a swingably mounted check valve flap carried by the plug and disposed in the port thereof, the flap being movable into closed relation with the seat to prevent flow of fluid in one direction, the flap being swingable into open position with respect to the seat to permit fluid flow in the opposite direction, the direction of fluid flow depending upon the predetermined setting of the plug selected;
   d. a counterweight provided on the flap and projecting outwardly in a radial direction beyond the rim of the flap and arranged to increase the total surface area against which back pressure of the fluid will act in urging the flap to close upon the seat, the counterweight being sufficiently heavy to prevent chattering of the flap; and
   e. the flap being secured at its top to the plug by a horizontal journal pin, the flap defining opposite faces, one face being movable against the seat, and the counterweight being disposed on the other face of the flap in outwardly offset relation with respect to a vertical plane passing through the journal pin, the offsetting being in a direction away from the seat to urge the counterweight and flap toward the seat by gravity.